United States Patent [19]

Cutter et al.

[11] Patent Number: 5,084,495
[45] Date of Patent: Jan. 28, 1992

[54] METHOD OF TRANSFERRING LATEX PARTICLES FROM AN AQUEOUS TO AN ORGANIC PHASE AND MAKING AN IMPACT RESISTANT ACRYLIC SHEET

[75] Inventors: Louis A. Cutter, Pittsburgh; John J. Godfrey, Murrysville, both of Pa.

[73] Assignee: Aristech Chemical Corporation, Pittsburgh, Pa.

[21] Appl. No.: 419,230

[22] Filed: Oct. 10, 1989

Related U.S. Application Data

[63] Continuation of Ser. No. 171,091, Mar. 21, 1988, abandoned.

[51] Int. Cl.$^5$ .................................................. C08K 3/00
[52] U.S. Cl. .................................... 523/336; 524/458
[58] Field of Search ............................ 523/336; 524/458

[56] References Cited

U.S. PATENT DOCUMENTS

| | | | |
|---|---|---|---|
| 2,809,948 | 10/1957 | Hunter et al. | 260/28.5 |
| 3,663,655 | 5/1972 | Sturt | 260/875 |
| 3,944,630 | 3/1976 | Ide et al. | 260/879 |
| 4,277,574 | 7/1981 | Jastrzebski et al. | 525/86 |
| 4,284,737 | 8/1981 | Kruse et al. | 525/243 |
| 4,543,383 | 9/1985 | Heil et al. | 524/458 |

OTHER PUBLICATIONS

K. E. J. Barrett and/M. W. Thompson, "The Preparation of Polymer Dispersions in Organic Liquids", Chapter 5, pp. 201–205 and 240–241, Dispersion Polymerization in Organic Media, Wiley, Imperial Chemical Industries (1975).

*Primary Examiner*—Joseph L. Schofer
*Assistant Examiner*—Peter Mulcahy
*Attorney, Agent, or Firm*—William L. Krayer

[57] ABSTRACT

Impact resistant compositions are prepared by the incorporation of acrylic rubber particles (or multi-stage emulsion polymer particles containing a rubbery layer) in a predominantly methyl methacrylate matrix. The emulsion particles are prepared in water as a latex stabilized with anionic groups. The particles are transferred to a methyl methacrylate medium by destabilizing the latex with a quaternary ammonium salt and optionally a di- or multivalent inorganic salt. Impact resistant compositions are prepared by separating the water from the methyl methacrylate layer and polymerizing the methyl methacrylate.

5 Claims, No Drawings

METHOD OF TRANSFERRING LATEX PARTICLES FROM AN AQUEOUS TO AN ORGANIC PHASE AND MAKING AN IMPACT RESISTANT ACRYLIC SHEET

This is a continuation of applications Ser. No. 171,091, filed Mar. 21, 1988 now abandoned.

TECHNICAL FIELD

This invention relates to the manufacture of acrylic compositions having resistance to damage from impact. In particular, it relates to the problem of combining small rubbery particles made in aqueous suspension with a matrix or continuous phase substantially of polymethylmethacrylate. The problem arises from the fact that the rubbery particles which lend impact resistance to the polymethylmethacrylate material are made in an aqueous medium and must be separated from the aqueous medium in an efficient manner prior to or upon addition to the polymethylmethacrylate medium.

BACKGROUND ART

It is known to make "impact resistant" polymethylmethacrylate material (hereafter sometimes called "acrylic" material) by including within the matrix of an acrylic sheet or other form of acrylic ester polymer an effective amount of rubbery particles, usually having a butyl acrylate or a butadiene content sufficient to render the product relatively resilient. The particles are generally made separately from the acrylic matrix, and must be added to it by thoroughly mixing them into the matrix medium prior to the polymerization of the methacrylate matrix. Representative of the prior art processes in which the impact modifier particles are separated and dried before being mixed into the organic polymerizable mixture are U.S. Pat. Nos. 4,513,111, 3,919,157, 4,433,103, 4,564,653, 4,490,507, and 4,595,728. Two different suspensions are mixed in U.S. Pat. No. 4,487,890 and U.S. Pat. No. 4,558,099, and two compositions are blended in dry form in U.S. Pat. Nos. 4,556,692 and 3,988,392. The reader may also be interested in U.S. Pat. Nos. 3,944,630 and 4,491,658 which describe other variations on manufacture and recovery of the modifier.

Perhaps more relevant to the present invention are U.S. Pat. Nos. 4,543,383, 4,284,737, and 4,277,574. The first-mentioned '383 patent is a continuous process in which an entire rubbery emulsion is transferred from a first reactor to a second reactor in order to graft methyl methacrylate on the first emulsified material. Water is introduced in the second reactor, however, and an optional third reactor also does not purport to separate an organic phase from the aqueous phase while at the same time distributing the rubbery impact modifier particles throughout an organic matrix. In the '737 patent, a rubbery latex is de-emulsified with a cationic surfactant and extracted as a liquid oil phase, e.g. the examples recite that the rubber particles were extracted into the "monomer or oil phase", providing efficient dewatering. The composition is a rubbery ABS and the other ingredients are specific and not similar to applicants'; moreover, the polymerization in the denominated matrix phase is conducted in the presence of water although water is said to be continuously removed from it. In the '574 patent, rubbery particles are also demulsified from an aqueous latex through the use of cationic surfactants, the latex being extracted into a phase of monomers as a liquid oil phase. The rubber, however, is limited to a grafted diene rubber and the monomer phase is essentially an alkenyl nitrile monomer.

DISCLOSURE OF INVENTION

The present invention includes a method of making an impact-modified polymethylmethacrylate. The method comprises (a) making a rubbery dispersion in an aqueous medium through the use of an anionic surfactant, the rubbery dispersion being of particles comprising primarily butyl acrylate, methyl methacrylate, styrene and a multifunctional acrylate or methyacrylate, and (b) adding the entire dispersion including the aqueous medium to a monomer mixture comprising primarily methyl methacrylate (although if the process is carried out continuously then two streams or aliquots are continuously merged), where a salt such as magnesium sulfate is also contacted with it along with a quaternary ammonium salt of the type described below. The inorganic salt and the quaternary organic salt neutralize the effect of the anionic surfactant and facilitate the transfer of the organic latex particles to the organic phase of the methyl methacrylate containing mixture. The water is physically separated and the remaining dispersion of particles in an essentially organic mixture of monomers (primarily methyl methacrylate) is ready for curing or polymerization to make an article having the impact resistant properties desired.

The present invention may also be described as a process for transferring organic particles of the type described above in an aqueous dispersion directly into methyl methacrylate by contacting the aqueous dispersion with the methyl methacrylate in the presence of a cationic surfactant having at least four carbon atoms, but preferably one with at least one chain having at least eight carbon atoms.

The modifier particles may be made in a number of ways using various ingredients. Generally the modifier particles should be made by emulsion polymerization so that each particle contains a rubbery layer, made from 50–100 parts butyl acrylate, 0–25 parts of styrene and about 0.1 to 10 parts of a multifunctional acrylate or methacrylate, such as allyl methacrylate, allyl crotonate, butanedioldiacrylate or butanedioldimethacrylate, hexanediol dimethacrylate or acrylate. The particles grow by emulsion polymerization from a small core less than 100 nanometers to a particle which may be 100 to 3000 nanometers in size. These particles in addition to a rubbery layer may also comprise a harder layer comprising methyl methacrylate 60–100 parts, an acrylate of 1–4 carbon atoms 0–30 parts; optionally other monofunctional monomers, may be internal to or external to the rubber layer. The monomers of each layer are added to water and polymerized by emulsion polymerization with agitation in the presence of an anionic emulsifier with a free radical initiator system capable of producing free radicals in the aqueous phase. At the termination of the formation of each layer, when the polymerization of the monomers already added is substantially complete, additional monomers are added optionally with additional water and initiators to complete the polymerization. The anionic emulsifier is a material containing both hydrophilic and organophilic groups, the hydrophilic part being a material capable of forming an anion, and a positively charged counter ion. Examples of such materials are the ammonium or alkali or salts of long chain (6–18 carbon atoms) carboxylic acids, sulfates, or sulfonates. Particularly effective emulsifiers are the dihexyl, dioctyl through ditrideyl sulfosuccinates. The resulting mixture at the end of the polymerization reaction is a milky aqueous emulsion of rubbery particles of 100-3000 nm which may contain a harder polymeric core or shell, containing 10-60 parts polymer solids and 90-40 parts of water.

To achieve a dispersion of the thus made rubbery particles in a continuous phase of polymerizable acrylic monomers (generally a mix comprising about 80 to about 95 percent by weight of methyl methacrylate and about 0 to about 10 percent of an acrylate of 1-4 carbon atoms), the latex is contacted with the monomers in the presence of a cationic surfactant of the formula:

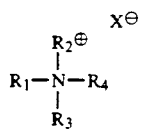

wherein X is an anion, preferably a halide, $R_1$ and $R_2$ are independently selected from alkyl groups having from one to four carbon atoms and $R_3$ and $R_4$ are alkyl groups having up to 24 carbon atoms. The mixture is then subjected to a physical separation preferably by simple decanting, optionally aided by a liquid centrifuge. It is observed that the cationic surfactant has apparently rendered the modifier particles organophilic and facilitated their transfer into the monomer phase. The separated organic phase can now be polymerized to form a solid composition containing the preformed particles and having a desirable impact resistance after drying and the addition of cross-linkers, release agents, and free radical initiators, ingredients known to those skilled in the art.

Along with the quaternary ammonium salt, certain known inorganic latex destabilizing agents may be employed. Among these are magnesium sulfate or other water soluble salts of di- or multivalent atoms and anions.

The quaternary ammonium salt should be used in a concentration equivalent to or in excess of the molar amount of the anionic emulsifer present.

The invention will be described in more detail with reference to the examples and tables below.

BEST MODE FOR CARRYING OUT THE INVENTION

The invention will be described below in general terms and also with respect to certain laboratory work and exemplary data.

A. INTRODUCTION a. Preparation of the Particles and the Matrix

Impact modifier particles are made by emulsion polymerization, resulting in an aqueous dispersion of particles comprising butyl acrylate, ethyl methacrylate, styrene, and a cross-linking di-functional monomer.

Methyl methacrylate and latex are mixed with mild agitation for 30 minutes with two destabilizers—magnesium sulfate (1% of the latex), and quaternary ammonium salt in excess of the amount required to neutralize the Aerosol OT emulsifier in the latex. The latex breaks, with the latex particles migrating from the aqueous to the organic phase. Mild agitation is important; excessive agitation leads to the formation of small water droplets which are difficult to separate. Stopping agitation after the initial preparation of the feed mixture is helpful in maintaining a readily separable suspension.

b. Separation

Separation of the phases is conducted in a Baker Perkins Podbielniak contactor, a centrifugal countercurrent extractor. The mixed feed enters near the periphery. The product (methyl methacrylate and latex particles) leaves at the hub, while the water leaves at the periphery.

c. Washing

Wash water enters near the hub, flows countercurrent to the methyl methacrylate, which is the continuous phase, and leaves with the water from the latex at the periphery.

d. Separation of Water from Methyl Methacrylate

The organic phase product containing the particulate modifier leaves the contactor saturated with water (about 1.3%), and must be dried by azeotropic vacuum distillation to about 0.1 percent water prior to casting. This operation comprises vacuum distillation of the mixture at a temperature low enough that polymerization of the methyl methacrylate does not occur (less than 100° C.), condensing the azeotrope collected overhead, allowing the azeotropic mixture to separate into two phases, a water and a methyl methacrylate phase. The water is discarded, and the methyl methacrylate refluxed in the distillation column.

e. Separation of Methyl Methacrylate from Water

The water leaving the contactor is saturate with methyl methacrylate (about 1.5%), which also can be separated by azeotropic distillation, if it is desired to recycle the methyl methacrylate.

f. Syrupping

To increase the viscosity of the mixture, a syrupping polymerization (with the addition of comonomers not added previously) may be desirable to reach a convenient viscosity for casting. If the separation is made so that the viscosity is already in the convenient range of 50-1000 centipoises, syrupping can be omitted.

B. MATERIALS

1. Latices

Three impact modifier latices of a core/shell structure were tested, comprising a styrene butyl acrylate rubber layer and layers rich in methyl methacrylate, all layers cross-linked so that the particles swell but do not dissolve in methyl methacrylate.

Type A-A latex of about 32.4 percent solids, with particle size 594 nm with methyl methacrylate-rich layers containing 20 percent butyl acrylate.

Type B-A latex of about 32.4 percent solids, with particle size 598 nm, with methyl methacrylate-rich layers containing 6 percent butyl acrylate.

Type C-A latex of about 32.4 percent solids with particle size 233 nm, with a methyl methacrylate-rich layer containing 7 percent butyl acrylate.

2. Methyl Methacrylate

Methyl methacrylate inhibited with Topanol A.

3. Butyl Acrylate

Butyl acrylate inhibited with MEHQ.

4. Syrup

Syrup made by the polymerization of methyl methacrylate to a viscosity of about 300 centipoises.

5. Arquad 12-50

A 50 percent trimethyl dodecyl ammonium chloride solution. Akzo Chemie America (Armak Chemicals).

6. Bardac 2250

A 50 percent didecyl dimethyl ammonium chloride solution. Lonza, Inc.

7. Magnesium Sulfate $MgSO_4 \cdot 7H_2O$ Dow Chemical Company.

C. EQUIPMENT

1. Test Setup

The test mixture was made up in a stirred tank and pumped to the contactor inlet. Deionized wash-water was fed to the contactor countercurrent to the feed.

2. Model A-1 Podbielniak Contactor

The separation was performed in a Model A-1 Podbielniak contactor, a 7-inch-diameter disk, 1-inch wide, rotating at 10,000 rpm (10,000 times gravity at the periphery, and 3000 times gravity at the hub). Inside the unit are concentric bands, contactor bands in the central part of the machine, while at the center and periphery are sets of two separator bands. The contactor bands produce a high velocity for good dispersion and contacting. The separator bands are designed to promote complete separation of the two phases. The feed from the mixing tank, containing latex and methyl methacrylate, entered near the periphery (90% of the radius), and the wash-water entered at a point near the hub (30% of the radius). The water layer left the contactor at the periphery and the extract containing methyl methacrylate and latex particles left at the hub.

To avoid seal leakage, the unit was set up with water on the outer seals, and methyl methacrylate on the inner seals.

3. Control a. Feed

The flow of the mixture from the feed tank was controlled by the speed of the feed pump, to obtain the desired product rate.

b. Wash Water

Wash water, from the deionized water system, was monitored by a rotameter in the feed line and controlled by the speed of the feed pump, and the setting of a spring-loaded back-pressure controller in the by-pass line.

c. Outlet Flows

Outlet flows of product and wastewater were measured with graduates and stopwatch.

d. Interface Control

The location of the major interface between methyl methacrylate and water in the machine was controlled by controlling the pressures of both outlet streams on the outlet with spring-loaded back-pressure controllers. The interface was kept near the feed port so that in most of the machine, methyl methacrylate was the continuous phase. The outlet water was controlled at a minimum pressure and the pressure of the outlet product adjusted so that a clear water effluent was just maintained.

e. Product Moisture

Product moisture was monitored by a rapid, automated Karl Fischer titration.

4. Product Evaluation

The product dispersion of modifier in MMA was dried to 0.1 to 0.2 percent moisture on a laboratory rotary flash evaporator (Buchi) and cast at a modifier concentration of about 10.7 percent. Impact and haze were measured on the sheet as cast. Water sensitivity was evaluated by measuring haze after soaking in water 24 hours at 82° C.

D. Results and Discussion

1. Establishing Operating Conditions a. Effect of Wash Rate on Capacity

As the wash rate increases, capacity decreases. It is desirable to operate at the minimum wash rate consistent with acceptable product performance, both to obtain maximum machine capacity and reduce wash water consumption.

b. Effect of Washing on Product Performance

The data of Table I show the effect of single- and two-stage washing on product performance. Modifier A-1 (similar to modifier A, but with a particle size of 638 nm) was run with and without countercurrent water washing on the Podbielniak contactor. The washed product was reslurried with water and rewashed on the Podbielniak contactor.

Samples of these products were dehydrated, cast, and evaluated.

The results of Table I showed satisfactory water sensitivity without countercurrent water washing, and very little improvement with countercurrent washing, or with two-stage washing. Impact values comparable to controls prepared by coagulation, washing, and drying were obtained. For that reason, a very low wash rate of about 0.15 lb wash/lb product was selected for further testing.

TABLE I

| | Direct Transfer - Effect of Washing | | | |
|---|---|---|---|---|
| | Run | | | |
| | 1 | 2 | 3 | 4 |
| Feed Tank, wt % | | | | |
| Methyl Methacrylate | 71.4 | 71.4 | Washed Product | |
| Latex Modifier A-1* | 28.6 | 28.6 | Run No. 1 | 71.4 | 71.4 |
| $MgSO_4 \cdot 7H_2O$ | 0.29 | 0.29 | Water | 28.6 | 28.6 |
| Arquad 12-50 | 0.153 | 0.153 | | | |
| Wash Rate, lb/lb Prod. | 0.44 | 0 | | 0.7 | 0.7 |

TABLE I-continued

|  | Direct Transfer - Effect of Washing | | | |
|---|---|---|---|---|
|  | Run | | | |
|  | 1 | 2 | 3 | 4 |
| Product Rate, cc/min | 360 | 440–740 | 230–240 | 195–315 |
| Wastewater, % Solids | 0.5–1.4 | — | 0.35–0.48 | 0.015–0.015 |
| Conductivity Micromhos | 3200–3600 | 7700 | 36–39 | 39–43 |
| Product Moisture, % | 1.2–1.5 | 1.3 | 2.5–2.7 | 1.25–1.71 |
| Dried Product Moisture % | 0.16 | 0.11 | 0.12 | 0.13 |
| Sheet Properties |  |  |  |  |
| Gardner Impact, in.-lb | 28 | 29 | 30 | 27 |
| Haze, % | 5.5 | 4.2 | 3.7 | 4.1 |
| Haze After 24 hrs in Water at 82° C. | 10.6 | 8.7 | 5.9 | 6.7 |
| Controls Prepared by Coagulation, Washing, & Drying |  |  |  |  |
| Gardner Impact, in.-lb | 29 | 32 |  |  |
| Haze, % | 3.7 | 5.7 |  |  |
| Haze After 24 hrs in Water at 82° C., % | 5.9 | 6.9 |  |  |

*Similar to modifier A, but with a particle size of 638 nm.

2. Effect of Modifier

Latices A, B, and C described earlier were run on the A-1 contactor, run Nos. 1, 3, and 4 (Table II). All three performed well in the contactor (Table III). Castings gave acceptably low water sensitivity in all cases and impact values equal to or better than control materials prepared by coagulation, washing, and drying (Table IV).

TABLE II

|  | Direct Transfer - Charge to Feed Tank | | | | |
|---|---|---|---|---|---|
|  | Run No. | | | | |
|  | 1 | 2 | 3 | 4 | 5 |
| Charge, wt % |  |  |  |  |  |
| Methyl Methacrylate | 71.4 | 71.3 | 71.4 | 71.4 | 55.9 |
| Butyl Acrylate | 0 | 0 | 0 | 0 | 4.9 |
| I-300 Syrup | 0 | 0 | 0 | 0 | 12.2 |
| Latex |  |  |  |  |  |
| Type | A | A | B | C | B |
| Wt % | 28.6 | 28.6 | 28.6 | 28.6 | 27.0 |
| MgSO$_4$.7H$_2$O | 0.29 | 0.29 | 0.29 | 0.29 | 0.27 |
| Quaternary | Arquad 12-50 | Bardac 2250 | Arquad 12-50 | Arquad 12-50 | Arquad 12-50 |
| Wt % | 0.153 | 0.209 | 0.153 | 0.153 | 0.145 |

TABLE III

|  | Operating Data - Monroeville Pod Test | | | | |
|---|---|---|---|---|---|
|  | Run | | | | |
|  | 1 | 2 | 3 | 4 | 5 |
| Latex | A | A | B | C | B |
| Quaternary | Arquad 12-50 | Bardac 2250 | Arquad 12-50 | Arquad 12-50 | Arquad 12-50 |
| Product Rate, cc/min | 330 | 350 | 460 | 420 | 380 |
| Wash Rate, lb/lb Extract | 0.16 | 0.15 | 0.11 | 0.12 | 0.14 |
| Water Out, cc/min | 130 | 130 | 140 | 130 | 150 |
| Moisture Product, % | 1.59 | 1.51 | 1.73 | 1.32 | 1.62 |
| Water |  |  |  |  |  |
| Total Solids, % | 0.56 | 2.0 | 2.29 | 0.99 |  |
| Filt Solids, ppm | 44 | 40 | 29 | 43 | 23 |
| Conductivity, microhmo | 4000 | 4900 | 5000 | 6000 |  |
| Mg Product, ppm | 0.15 | 0.08 | 0.36 | 0.93 |  |
| H$_2$O, ppm | 605 | 489 | 841 | 1071 |  |
| N Product, ppm | 21 | 29 | 9 | 13 |  |
| H$_2$O, ppm | 8.1 | 6.8 | 11 | 10 |  |
| Oust |  |  |  |  |  |
| Prod, % Charged | 42 | 58.5 | 18.0 | 33.6 |  |
| H$_2$O, % Charged | 6.6 | 5.6 | 7.0 | 19.9 |  |
| Total | 48.6 | 63.1 | 25.0 | 53.5 |  |

TABLE III-continued

| Operating Data - Monroeville Pod Test | | | | | |
|---|---|---|---|---|---|
| | Run | | | | |
| | 1 | 2 | 3 | 4 | 5 |
| Oust by GC | | | | | |
| Prod, ppm | 1600 | 1030 | 1500 | 1300 | |
| H$_2$O, ppm | 1300 | 0 | 2000 | 1300 | |
| Prod, % Chgd | 85.5 | 40.2 | 80.0 | 69.4 | |
| H$_2$O, % Chgd | 28.4 | 0 | 33.9 | 22.4 | |
| Total | 113.9 | 40.2 | 113.9 | 91.8 | |

TABLE IV

| Product Data - Castings 10.7 Percent Modifier | | | | | | |
|---|---|---|---|---|---|---|
| Run | Latex | Out | % H$_2$O | Haze | Haze H$_2$O 24 hrs at 180° F. | Inst Impact ft-lb |
| 1 | A | Arquad | 0.12 | 5.7 | 10.6 | 2.66 |
| 2 | A | Bardac | 0.06 | 6.6 | 9.2 | 3.02 |
| 3 | B | Arquad | 0.13 | 9.6 | 13.9 | 2.71 |
| 4 | C | Arquad | 0.13 | 4.6 | 9.5 | 2.45 |
| | A | Coagulated, Wash Dry | | 4.0 | 18.0 | |
| | B | Coagulated, Wash Dry | | 2.4 | 4.4 | 2.54 |
| | C | Coagulated, Wash Dry | | 2.9 | 5.7 | 1.73 |
| 5 | B | Arquad transfer w/syrup & butyl acrylate | 0.17 | 4.3 | 11.8 | 2.10 |
| | | Same dried in pilot plant | 0.14 | 3.4 | 7.4 | |

3. Effect of Quaternary

In run No. 2, an equivalent amount of Bardac 2250 (didecyl dimethyl ammonium chloride) was substituted for the Arquad 12-50 (trimethyl dodecyl ammonium chloride). No change in contactor performance was noted, or any change in the water sensitivity of the sheet produced from the extract. The Bardac has two long, organic chains as compared with one for the Arquad, and thus might be expected to be less hydrophilic.

4. Effect of Syrup and Butyl Acrylate

The addition of syrup and butyl acrylate to the mix tank before transfer was undertaken to avoid the syruping step after drying the extract. The contactor performed well with the additions. Little change in viscosity was noted. Castings were made and the properties seem unaffected by the change.

5. Extended Run

An extended run was made with Latex B to provide enough extract for a half-promoter batch. During this run, made as in run No. 3, 2068 lb of extract was produced. This material was dehydrated and commercial scale casting is anticipated.

6. Analysis of Streams a. Quaternary Analysis

Quaternaries have been analyzed by two methods—Kjeldahl nitrogen and by gas chromatography. Both methods indicate that a substantial portion of the quaternary remains in the organic product, probably due to the formation of an organophilic salt between the quaternary and the anionic surfactant.

b. Magnesium Analysis

The magnesium is washed nearly completely out of the organic layer, with less than 1 ppm remaining in all cases.

c. Water Analysis

Moisture in the extract before drying was in the range 1.3 to 1.7 percent in the organic phase, saturated but without a high content of droplets of free water.

We claim:

1. A process for transferring impact modifier particles from a dispersion containing an anionic surfactant in an aqueous medium to an organic medium comprising methyl methacrylate, which process comprises contacting said aqueous medium including said particles with a medium primarily of methyl methacrylate and with a quaternary ammonium surfactant within the general formula:

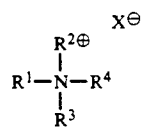

wherein X is a halide, $R^1$ and $R^2$ are independently selected from alkyl groups having from one to four carbon atoms and $R^3$ and $R^4$ are alkyl groups having up to 24 carbon atoms, whereby said particles are converted from hydrophilic to hydrophobic.

2. Process of claim 1 wherein the impact modifier latex is the polymerization product of butyl acrylate styrene and methyl methacrylate, and a small amount of cross-linking monomer.

3. Process of claim 1 wherein the quaternary ammonium surfactant is present in an amount of 0.05 to 1.0 percent and there is also present with the quaternary ammonium surfactant an inorganic salt soluble in water and capable of producing di- or polyvalent ions.

4. Method of claim 3 wherein the inorganic salt is magnesium sulfate.

5. Method of claim 1 wherein at least one of $R^3$ and $R^4$ has at least eight carbon atoms.

* * * * *

UNITED STATES PATENT AND TRADEMARK OFFICE
CERTIFICATE OF CORRECTION

PATENT NO.  : 5,084,495

DATED       : January 28, 1992

INVENTOR(S) : Cutter et al

It is certified that error appears in the above-identified patent and that said Letters Patent is hereby corrected as shown below:

Column 2, line 12, change "methyacrylate" to -- methacrylate --.

Column 8, Table III, first column, fourth line from the bottom, change "Oust" to -- Quat --.

Column 9, Table III - continued, first column, change the heading "Oust by GC" to -- Quat by GC --.

Column 9, Table IV, third column, change the heading "Out" to -- Quat --.

Signed and Sealed this

Twenty-seventh Day of April, 1993

*Attest:*

MICHAEL K. KIRK

*Attesting Officer*     *Acting Commissioner of Patents and Trademarks*